(12) United States Patent
Idzik et al.

(10) Patent No.: US 9,182,840 B2
(45) Date of Patent: Nov. 10, 2015

(54) APPARATUS AND METHOD PERTAINING TO A STYLUS HAVING A PLURALITY OF NON-PASSIVE LOCATION MODALITIES

(75) Inventors: Jacek S. Idzik, Kenilworth (CA); Rohan Michael Nandakumar, Kitchener (CA); Cornel Mercea, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 141 days.

(21) Appl. No.: 13/562,918

(22) Filed: Jul. 31, 2012

(65) Prior Publication Data

US 2014/0035882 A1    Feb. 6, 2014

(51) Int. Cl.
*G06F 3/033*    (2013.01)
*G06F 3/038*    (2013.01)
*G06F 3/0354*   (2013.01)

(52) U.S. Cl.
CPC .......... *G06F 3/0383* (2013.01); *G06F 3/03545* (2013.01); *G06F 2203/0384* (2013.01)

(58) Field of Classification Search
CPC ... G06F 3/033; G06F 3/0354; G06F 3/03542; G06F 3/03545; G06F 3/03546; G06F 3/038; G06F 3/0383; G06F 3/0386; G06F 3/0317; G06F 2203/0381; G06F 2203/0384
USPC .............. 345/179; 178/19.01–19.06
See application file for complete search history.

(56) References Cited

U.S. PATENT DOCUMENTS

| | | | |
|---|---|---|---|
| 5,308,936 A * | 5/1994 | Biggs et al. ................ | 178/19.02 |
| 7,483,018 B2 * | 1/2009 | Oliver ........................... | 345/179 |
| 7,499,035 B2 | 3/2009 | Kolmykov-Zotov et al. | |
| 7,646,379 B1 | 1/2010 | Drennan et al. | |
| 7,656,395 B2 * | 2/2010 | Pope et al. ..................... | 345/179 |
| 7,719,515 B2 | 5/2010 | Fujiwara et al. | |
| 7,999,794 B2 | 8/2011 | Janik | |
| 2002/0040817 A1 * | 4/2002 | LeKuch et al. ............ | 178/18.09 |
| 2002/0163511 A1 * | 11/2002 | Sekendur ...................... | 345/179 |
| 2005/0110777 A1 | 5/2005 | Geaghan et al. | |
| 2006/0227121 A1 | 10/2006 | Oliver | |
| 2009/0139778 A1 | 6/2009 | Butler et al. | |
| 2010/0220078 A1 | 9/2010 | Zloter et al. | |
| 2011/0291998 A1 * | 12/2011 | Adams et al. ................. | 345/179 |

(Continued)

FOREIGN PATENT DOCUMENTS

| | | | |
|---|---|---|---|
| WO | 2006/133018 A1 | 12/2006 | |
| WO | 2011154950 A1 | 12/2011 | |

OTHER PUBLICATIONS

Extended European Search Report from related European Patent Application No. 12178635.4 dated Nov. 9, 2012; 7 pages.

(Continued)

*Primary Examiner* — Stephen Sherman
(74) *Attorney, Agent, or Firm* — Jose Gutman; Fleit Gibbons Gutman Bongini & Bianco P.L.

(57) ABSTRACT

A stylus, configured for interactive use with a surface such as but not limited to a display, includes a stylus housing that supports a control circuit. The control circuit is configured to selectively effect at least two different non-passive location modalities wherein each of the non-passive location modalities imparts location-determination information. The plurality of non-passive location modalities can be selectively used in combination with one another or in a singular fashion as desired.

17 Claims, 2 Drawing Sheets

(56) References Cited

U.S. PATENT DOCUMENTS

2012/0062520 A1   3/2012  Knee
2012/0062521 A1   3/2012  Ahn et al.
2012/0086661 A1   4/2012  Shi et al.

OTHER PUBLICATIONS

Article 94(3) EPC from related European Patent Application No. 12178635.4 dated Nov. 11, 2013; 6 pages.
Canadian Office Action from related Canadian Patent Application No. 2,822,622 dated Sep. 8, 2014; 4 pages.

* cited by examiner

APPARATUS AND METHOD PERTAINING TO A STYLUS HAVING A PLURALITY OF NON-PASSIVE LOCATION MODALITIES

FIELD OF TECHNOLOGY

The present disclosure relates to non-passive styli and to surfaces configured to receive input via non-passive stylus.

BACKGROUND

Many electronic devices, including portable electronic devices such as but not limited to so-called smartphones and tablet/pad-styled devices, are configured to receive user input, at least in part, via a surface such as a display. A touch-sensitive display, for example, provides a way for a user to tap or swipe the display surface with a finger in order to express selections, input information, and so forth.

Many devices are configured to work specifically with a hand-held stylus in these same regards (either in lieu of the foregoing or in combination therewith). Some displays, for example, include a plurality of light-emitting transmitter/receiver pairs disposed along the sides of the display. By determining where a stylus breaks one of the corresponding light beams the device can determine a present location of the stylus and utilize that location information accordingly. Such an approach represents a passive location modality in that the behavior of the stylus as regards imparting location-determination information or otherwise participating in the location-determining process is passive.

In some instances the stylus comprises a non-passive stylus. In some cases this means the stylus includes one or more electrically-powered components that serve to interact with the display in a way that facilitates the display determining, for example, a point of contact between the stylus and the display. In general, a non-passive location modality pertains to stylus behavior that is other than a merely passive presence.

There are, in fact, a considerable number of non-passive location modalities presently known with more likely to become available. At least one reason for the considerable number of approaches in these regards is that no one approach is superior to all other approaches for all possible interactions. One approach, for example, might offer excellent results when the stylus contacts the surface while another competing approach offers better results when the stylus hovers close to the surface without contacting the surface.

DETAILED DESCRIPTION

Figure 1:
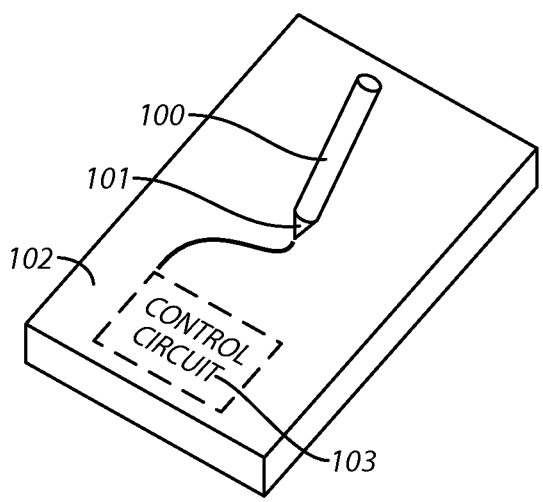
FIG. 1 is a perspective schematic view in accordance with the disclosure.

The following describes an apparatus and method pertaining to a stylus configured for interactive use with a surface such as but not limited to a display. The stylus includes a stylus housing that supports a control circuit. The control circuit is configured to selectively effect at least two different non-passive location modalities wherein each of the non-passive location modalities imparts location-determination information.

In particular, the foregoing non-passive location modalities can be different from one another in kind and not merely by degree. By way of illustration and without intending any limitations in these regards, a first non-passive location modality can comprise, say, a capacitively-based non-passive location modality while a second non-passive location modality can comprise an acoustically-based non-passive location modality.

Accordingly, one of the non-passive location modalities can perform better under some operating circumstances while another of the non-passive location modalities performs better under other operating circumstances. These teachings will accommodate selecting from amongst the candidate available non-passive location modalities to permit using a best approach at a given time These teachings are highly flexible in practice, however, and will accommodate a wide range of variations in these regards. As one example, these teachings will readily accommodate using more than one available non-passive location modality (either literally simultaneously or, for example, in a temporally-interleaved manner) to thereby merge the location-determining benefits of both approaches.

As another example, these teachings will accommodate using the location-determining results of one approach to calibrate the location-determining of another approach. Such calibration may be done only on-demand or automatically from time to time. Using this approach, for example, a high-quality (but high-power) approach can be used sparingly to calibrate a second (lower-power) approach and thereby achieve better than usual performance from the second approach.

As yet another example, these teachings will accommodate using more than one non-passive location modality in order to determine other attributes or states of the stylus such as whether the stylus is tilted, and if so by what degree and in what direction relative to the surface.

By readily accommodating any existing non-passive location modality as well as future developments in these regards, the present teachings are well suited to leverage the capabilities of such approaches while compensating for their corresponding weaknesses. These teachings are also highly scalable and can be readily employed in conjunction with a variety of differently-sized and differently-purposed styli, surfaces, and non-passive location modalities.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a stylus 100. Generally speaking, a stylus is typically a hand-held utensil that often (but not exclusively) has a pencil-like elongated form factor and that includes at least one pointed end (i.e., a writing tip 101) configured to interact with a corresponding surface 102. Using a stylus as an input mechanism with a display offers a variety of advantages over a fingertip including the opportunity for increased precision as well as an expression modality that accords with the user's own past experience with a pencil or pen.

The surface 102 can vary from one application setting to another. For the sake of illustration but without intending any limitations in these regards, it will be presumed here that the surface 102 comprises a display. In this case, then, interactions between the stylus 100 and the surface 102 can result, for example, in a selection of particular displayed actions, in the presentation of an electronic ink line, and so forth as desired. These various ways in which a stylus's interaction with a surface can be leveraged and utilized comprises a well-understood area of prior art endeavor. As the present teachings are not particularly sensitive to any particular selections in these regards, further elaboration here will not be presented for the sake of brevity.

Generally speaking, in a typical application setting, the surface 102 will include a control circuit 103 that works in cooperation with one or more location-determination systems/components (not shown) to determine a present location (and/or orientation) of the stylus 100. These location-determination systems/components can include a variety of transmitters and/or receivers for a variety of different kinds of energy. Again, the present teachings are not particularly sensitive to any particular choices in these regards save to ensure that the various location-determination modalities used for the stylus 100 are matched by the location-determining modalities of the surface 102. So configured, the control circuit 103 is configured to use location information from these location-determining modalities to determine a relative position of at least a portion of the stylus 100 with respect to the surface 102.

Figure 2:
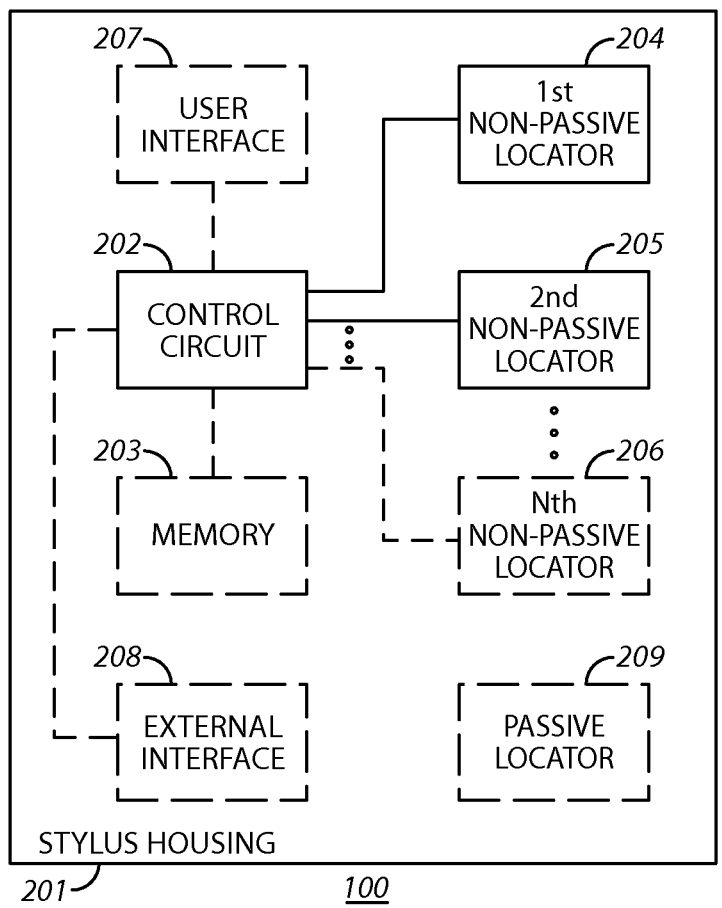
FIG. 2 is a block diagram in accordance with the disclosure.

FIG. 2 presents an illustrative depiction of the stylus 100. The stylus 100 includes a stylus housing 201. The stylus housing 201 will typically have a form factor suitable to accommodate hand-held use and manipulation per the intended and expected use and functionality of the tool. That said, this housing 201 can vary to some extent in size and shape and can be comprised of any of a variety of materials as best suit a given application setting (and, in some cases, a selection of particular non-passive location modalities to support).

The stylus housing 201 supports a number of components. These components may, in some cases, be integrated into a singular "component" or may comprise a plurality of physically discrete elements as desired.

A control circuit 202 can comprise a fixed-purpose hard-wired platform or can comprise a partially or wholly programmable platform. These architectural options are well known and understood in the art and require no further description here.

By one approach this control circuit 202 can include (or can otherwise be coupled to) a memory 203. This memory 203 can serve, for example, to non-transitorily store the computer instructions that, when executed by the control circuit 202, cause the control circuit 202 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

This control circuit 202 is configured to selectively effect at least two different non-passive location modalities where each of the non-passive location modalities imparts location-determination information to the aforementioned surface 102 (and in particular to the aforementioned surface control circuit 103). To support this capability the control circuit 202 operably couples to both a first and a second non-passive locator 204 and 205. (These teachings will in fact accommodate a greater number of non-passive locators as illustrated by optional inclusion of an Nth non-passive locator 206, where "N" is any integer greater than 3.)

These non-passive locators will typically vary from one another as suits the specific requirements of the corresponding location modality. In some cases, for example, the non-passive locator may include one or more transmitters of a particular kind of energy while in other cases the non-passive locator may include one more receivers.

Generally speaking, these teachings will support any of a wide variety of possibilities in these regards. Supported non-passive location modalities (and their corresponding non-passive locators) include, but are certainly not limited to:
  a capacitively-based non-passive location modality;
  an acoustically-based non-passive location modality;
  a magnetically-based non-passive location modality;
  a light-emitting-based non-passive location modality; and
  a radio-frequency-based non-passive location modality.

Specific examples in all of these regards abound in the prior art. The so-called EPOS™ system, for example, is an acoustically-based non-passive location modality while the N-Trig™ approach is an example of a capacitively-based non-passive location modality.

In a typical application setting the various available non-passive location modalities will differ from one another with respect to their present effectiveness. For example, a first available non-passive location modality (such as an acoustically-based non-passive location modality) may be more effective when the stylus 100 hovers over the surface 102 as compared to when the stylus 100 contacts the surface 102 while a second available non-passive location modality (such as a capacitively-based non-passive location modality) may be more effective when the stylus 100 contacts the surface 102 as compared to when the stylus 100 hovers over the surface 102.

By one approach, both such non-passive location modalities may be "on" simultaneously and essentially all the time. In such a case the surface control circuit 103 could, for example, use both modalities to determine the present location of the stylus 100 or could use whichever of the two approaches best suits the needs or circumstances of a given moment.

As a related approach, both such non-passive location modalities can be "on" and utilized in an interleaved manner with one another. 15 milliseconds is a typical delay time for determining and responding to stylus location determinations. By interleaving two different non-passive location modalities, however, it may be possible in some instances to effectively double the report-rate resolution (and hence reduce the corresponding latency) while also saving power.

By another approach, the stylus 100 can be configured to facilitate switching between such available non-passive location modalities. To facilitate a user-controlled selection the stylus 100 can optionally include, if desired, a user interface 207 (such as a button, switch, or the like) that operably couples to the control circuit 202. As one simple example in these regards, the user interface 207 could comprise a four-way switch where a first setting comprises an "off" setting, a second setting selects the first non-passive location modality only, a third setting selects the second non-passive location modality only, and the fourth setting selects both the first and second non-passive location modalities.

By yet another approach, in lieu of the foregoing or in combination therewith, the stylus control circuit 202 can be configured to automatically switch between use of these different non-passive location modalities. Such an approach might comprise, by way of example, switching between a first and second non-passive location modality as a function, at least in part, of proximity of the stylus housing 201 to the surface 102.

Figure 3:
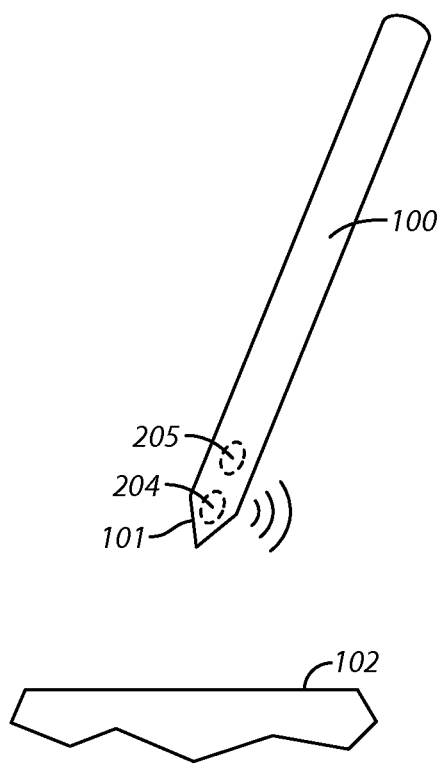
FIG. 3 is a side-elevational schematic view in accordance with the disclosure.
Figure 4:
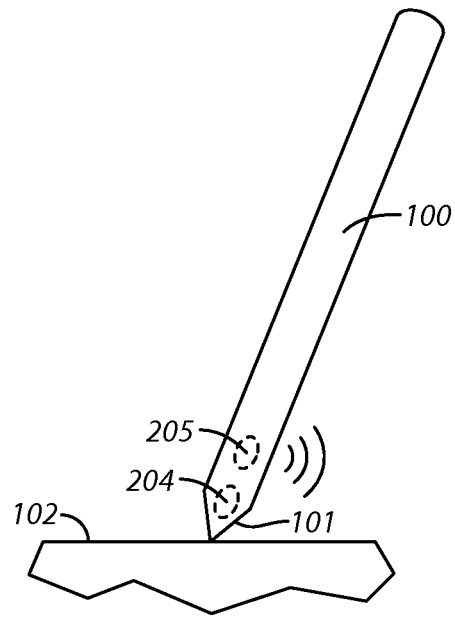
FIG. 4 is a side-elevational schematic view in accordance with the disclosure.

FIG. 3 depicts an illustrative example in these regards where the control circuit 202 has selected the first non-passive locator 204 as corresponds to the first non-passive location modality based upon the hovering state of the stylus 100 above the surface 102. In FIG. 4, however, the writing tip 101 of the stylus 100 contacts the surface 102 and the control circuit 202 has switched to using the second non-passive locator 205 as corresponds to the second non-passive location modality. By one approach the stylus 100 may unilaterally include sufficient sensors and/or information to inform the making of such a switch. By another approach the stylus 100 may receive information in these regards from the surface control circuit 103 (via, for example, an optional external interface 208 (such as but not limited to a Bluetooth™-compatible receiver or transceiver).

These teachings will also support configuring the stylus control circuit 202 to automatically determine when to simultaneously use both (or all) of the available non-passive location modalities, and/or to respond to such an instruction from the surface control circuit 103. This simultaneous use can comprise a literally simultaneous use if desired or can comprise an interleaved use of the applied non-passive location modalities as described above.

These teachings are highly flexible in practice and will readily accommodate a variety of modifications to the foregoing. For example, when one of the available non-passive location modalities includes a communication path with the surface control circuit 103, these teachings will accommodate configuring the stylus control circuit 202 to employ that non-passive location modality as a communications path as regards another of the non-passive location modalities. Such an approach may permit a reduced-power communications path and/or a more secure communications path to be used than would ordinarily be expected.

Figure 5:
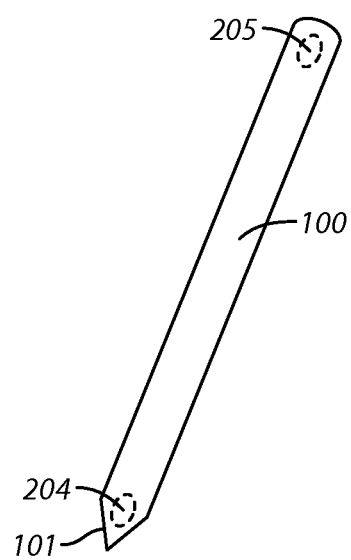
FIG. 5 is a perspective schematic view in accordance with the disclosure.

As another example in these regards, these teachings can be leveraged in other useful ways. FIG. 5 presents one illustrative example in these regards. Here, the first non-passive locator 204 is located proximal one end of the stylus 100 while the second non-passive locator 205 is located proximal an opposite end of the stylus 100. So configured, the two non-passive location modalities that correspond to these components impart location-determining information with respect to differing portions of the stylus housing 201 to an extent that permits the surface control circuit 103 to determine not only a relative position of the writing tip 101 of the stylus 100 with respect to the surface 102 but also tilt information regarding the stylus 100 as compared to the surface 102. Such tilt information, in turn, can be used by the surface control circuit 103 in any of a variety of ways as yet another user input.

And as yet another example in these regards, if desired such a stylus 100 can also include a passive locator 209 of choice to thereby support a passive location modality that may be appropriate for use with a given surface control circuit 103 (either alone or in combination with one or more of the available non-passive location modalities).

So configured, a stylus 100 capable of supporting more than one non-passive location modality can improve location resolution and latency and can work successfully with a wide variety of surfaces 102 including surfaces 102 that support only a single non-passive location modality as well as surfaces 102 that support a plurality of non-passive location modalities. These capabilities, in turn, contribute to an improved user experience and more effective use of the surface 102 itself.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
a stylus configured for interactive use with a surface comprising:
a stylus housing;
a control circuit supported by the stylus housing and configured to selectively effect at least two different non-passive location modalities that differ from one another in kind and not merely in degree, wherein each of the non-passive location modalities imparts location-determination information and wherein at least one of the non-passive location modalities has a capacitively-based non-passive location modality, wherein the control circuit is further configured to automatically switch between using the at least two different non-passive location modalities and further configured to automatically determine when to simultaneously use the at least two different non-passive location modalities.

2. The apparatus of claim 1 wherein the two different non-passive location modalities include the capacitively-based non-passive location modality and one further of at least one of:
an acoustically-based non-passive location modality;
a magnetically-based non-passive location modality;
a light-emitting-based non-passive location modality;
a radio-frequency-based non-passive location modality.

3. The apparatus of claim 1 wherein a first one of the at least two different non-passive location modalities is more effective when the stylus hovers over the surface as compared to when the stylus contacts the surface and a second one of the at least two different non-passive location modalities is more effective when the stylus contacts the surface as compared to when the stylus hovers over the surface.

4. The apparatus of claim 1 wherein the control circuit is further configured to automatically switch between using the at least two different non-passive location modalities to permit a best approach at a given time.

5. The apparatus of claim 4 wherein the control circuit is configured to automatically switch between using the at least two different non-passive location modalities as a function, at least in part, of proximity of the stylus housing to the surface.

6. The apparatus of claim 1 wherein the control circuit is further configured to automatically determine when to simultaneously use both of the at least two different non-passive location modalities to use a location-determining result of one non-passive location modality to calibrate a location determining result of another non-passive location modality.

7. The apparatus of claim 1 wherein the control circuit is further configured to employ one of the at least two different non-passive location modalities as a communications path as regards another of the at least two different non-passive location modalities.

8. The apparatus of claim 1 wherein the surface comprises, at least in part, a display.

9. The apparatus of claim 8 wherein the display includes a control circuit configured to use information from the at least two different non-passive location modalities to determine a relative position of at least a portion of the stylus with respect to the display.

10. The apparatus of claim 9 wherein the control circuit of the display is further configured to use location information from one of the at least two different non-passive location modalities to calibrate a use of location information from another of the at least two different non-passive location modalities.

11. The apparatus of claim 1 wherein the stylus further comprises a passive location modality.

12. The apparatus of claim 1 wherein the at least two different non-passive location modalities impart location-determination information with respect to differing portions of the stylus housing.

13. A method comprising:
   by a stylus control circuit as regards use of a stylus with a corresponding surface:
   automatically selecting use of at least one non-passive location modality from at least two different candidate non-passive location modalities that differ from one another in kind and not merely in degree, wherein each of the candidate non-passive location modalities imparts location-determination information and wherein at least one of the candidate non-passive location modalities has a capacitively-based non-passive location modality, wherein the stylus control circuit is configured to automatically switch between using the at least two different candidate non-passive location modalities and further configured to automatically determine when to simultaneously use the at least two different candidate non-passive location modalities.

14. The method of claim 13 wherein a first one of the at least two different candidate non-passive location modalities is more effective when the stylus hovers over the surface as compared to when the stylus contacts the surface and a second one of the at least two different candidate non-passive location modalities is more effective when the stylus contacts the surface as compared to when the stylus hovers over the surface.

15. The method of claim 13 wherein to automatically switch between using the at least two different non-passive location modalities as a function, at least in part, of proximity of the stylus housing to the surface.

16. The method of claim 13 wherein automatically selecting use of at least one non-passive location modality comprises, at least in part, automatically determining when to simultaneously use both of the at least two different candidate non-passive location modalities to use a location-determining result of one non-passive location modality to calibrate a location determining result of another non-passive location modality.

17. The method of claim 13 wherein automatically selecting use of at least one non-passive location modality comprises, at least in part, automatically switching between using the at least two different candidate non-passive location modalities as a function, at least in part, of proximity of the stylus to the surface.

* * * * *